Oct. 10, 1967 M. SWYRYD 3,346,821
OSCILLATOR
Filed Nov. 22, 1963
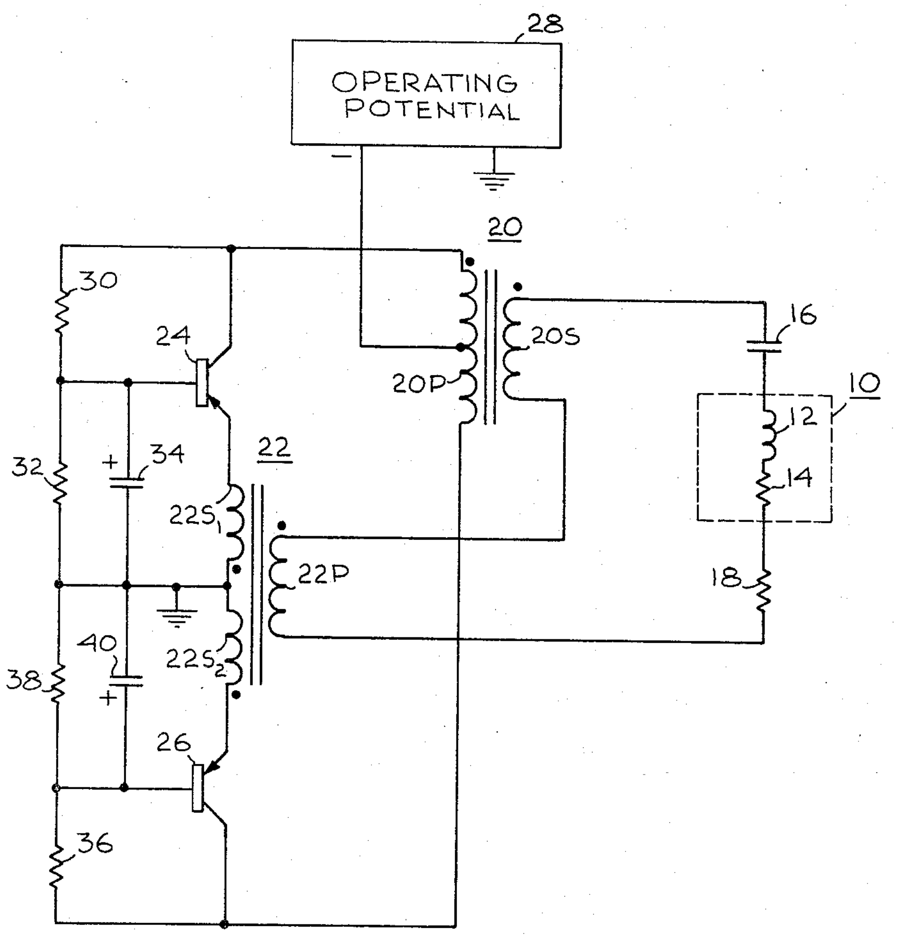
MIROSLAV SWYRYD
INVENTOR.
BY Stuart Lubitz
ATTORNEY 3,346,821

OSCILLATOR

Miroslav Swyryd, Palo Alto, Calif., assignor to Ampex Corporation, Redwood City, Calif., a corporation of California Filed Nov. 22, 1963, Ser. No. 325,673
5 Claims. (Cl. 331—113)

ABSTRACT OF THE DISCLOSURE

A current feedback oscillator circuit for delivering constant and maximum current to an inductive load, regardless of frequency variations, utilizing a current feedback transformer which senses the oscillator current amplitude in the inductive load to selftune the oscillator to the frequency which causes maximum current to be delivered to the inductive load.

Erase oscillators presently used in magnetic tape systems are designed as fixed frequency oscillators using positive voltage feedback. Usually, in these oscillators, the high impedance erase heads employed are series resonated with a variable capacitor, in order to lower the driving impedance and consequently increase the erase head current. Whenever the oscillator frequency drifts or the erase head inductance changes, the variable capacitor must be retuned in order to maintain maximum erase head current. Sometimes a "second level" control is incorporated for better adjustment of the erase head current to a specified or predetermined value. Since the quality of erasure for a given erase head design is dependent on erase current amplitude, it is quite important that a system be found to maintain constant the erase current amplitude which gives the best quality of erasure. If the erasure quality deteriorates then, upon playback after another recording has been made, the unerased information will be heard, together with the newly recorded information.

Accordingly, an object of this invention is to eliminate erase head current instability caused by changes in oscillator frequency and/or erase head inductance.

Another object of this invention is the provision of an oscillator circuit including an erase head which is self-tuning to the frequency at which the erase head accepts maximum current.

Still another object of the present invention is to provide an erase head oscillator circuit wherein the erase head current amplitude is established by the supply voltage employed.

Yet another object of the present invention is the provision of a novel, useful and improved erase head oscillator circuit.

These and other objects of this invention are achieved in an arrangement wherein the erase head is in a series resonant circuit which forms the frequency determining network for the oscillator. The series resonant circuit is transformer coupled to the amplifying elements of the oscillator which are designed to operate in a push-pull fully conducting or cutoff mode. The output from the amplifier is fed back through a current transfromer to the amplifier input, thus forming a regenerative oscillator. Since the amplifiers of the oscillator are operated between cutoff and saturation states, the oscillator peak to peak output voltage is proportional to the supply voltage. Therefore, the magnitude of the erase head current is simply controlled and determined by adjusting the supply voltage.

The novel features that are considered characteristic of this invention are set forth with particularity in the appended claims. The invention itself both as to its organization and method of operation, as well as additional objects and advantages thereof, will best be understood from the following description when read in connection with the accompanying drawing, which is a circuit diagram of an embodiment of the invention.

In the circuit diagram of the embodiment of the invention shown in the drawing, an erase head 10 is represented by a dotted rectangle which encloses an inductance 12 in series with a resistance 14. These circuit elements represent the equivalent winding of an erase head plus the core and copper losses. A capacitor 16 is connected in series with the erase head and its value is selected to be such that it is series resonant with the inductance 12, at the deired operating frequency, whereby the LC frequency determining network for the oscillator is established. The series connected resistor 18 is a low value resistance which provides a means of monitoring the erase head current amplitude and waveform.

The series resonant erase head circuit has one end connected to one end of the secondary winding 20S of an output transformer 20. The other end of the secondary winding is connected to one end of the primary winding 22P of a feedback transformer 22. The other end of the series resonant circuit is connected to the other end of the primary winding 22P. The oscillator amplifier 23 employs two transistors 24, 26, which are connected in a push-pull, common base configuration. The feedback transformer 22 has a center-tapped secondary winding wherein one portion, $22S_1$, is connected between ground and the emitter of transistor 24, and the other portion $22S_2$, is connected between ground and the emitter of transistor 26. Transformer 20 has a center-tapped primary winding and the center tap is connected to the source of operating potential 28. The collector of transistor 24 is connected to one end of the center-tapped primary winding 20P and the collector of transistor 26 is connected to the other end of the center-tapped primary winding 20P.

Base bias for transistor 24 is established by two series connected resistors respectively 30, 32, which are connected between the collector of transistor 24 and ground. The base of transistor 24 is connected to the junction between resistors 30 and 32. A capacitor 34 is connected across resistor 32. Base bias for transistor 26 is provided by series connected resistors 36, 38, which are connected between the collector of transistor 26 and ground. The junction between resistors 36 and 38 is connected to the base of transistor 26. A capacitor 40 is connected across resistor 38.

In operation, output of the amplifier 23 comprising the two transistors 24, 26 is developed at their collectors and is coupled by transformer 20 to the series resonant erase head 10. Transformer 22 is designed as a current transformer. Erase head current flows through the primary winding 22P. The winding sense of all of the transformers is denoted by the dot symbol, and in the case of the feedback transformer 22 is such as to provide positive feedback to the amplifier 23.

The positive feedback voltages at the emitters of transistors 24 and 26 act to alternately switch transistors 24 and 26 from cutoff to saturation. The resistors 30, 32, and 36, 38 act as voltage dividers to bias the bases of transistors 24 and 26. The transistors 24 and 26 operate in a switching mode during oscillation.

When the oscillator is first turned on (before oscillation starts), the negative biases provided by the voltage divider networks bias the transistors into their high gain active regions and assures self-starting of oscillation. When the oscillations build up to full amplitude the base-to-emitter bias changes polarity, and the transistors operate in a switching mode. Reverse DC bias voltages are developed across resistors 32 and 38 due to the base-to-emitter junctions rectifying a portion of the feedback current. Capacitor 34 charges to the peak voltage developed across resistor 32 and capacitor 40 charges to the peak voltage developed across resistor 38. As a result, a reverse base-to-emitter bias is provided for transistors 24 and 26 sufficient to cause cutoff. The feedback via transformer 22 to the transistors 24 and 26 alternately operate them to saturation. Thus, the transistors alternately operate between saturation cutoff states. Accordingly, the oscillator peak to peak output voltage which is applied to the transformer 20 is proportional to the supply voltage 28. Therefore the magnitude of the erase head current can be controlled by adjusting the supply voltage.

From the foregoing description of the circuit operation, it is seen that the oscillator output voltage waveform is nonsinusoidal. However due to the relatively high Q of the series resonant circuit formed by the erase head 10 and the capacitor 16 the waveform of the current flowing in the erase head is very nearly sinusoidal.

The requirement for oscillation in the circuit, comprising the embodiment of the invention, is that the phase of the current fed back to the transistors through the feedback transformer 22 must be such as to alternately switch transistors 24 and 26 from cutoff to saturation. This requirement is met when the circuit is oscillating at the resonant frequency of the series erase head inductance 12 and capacitance 16 because at the series resonant frequency, head current amplitude is maximum and is in phase with the transistor collector current. Feedback transformer 22 couples sufficient power back to the transistors 24 and 26 with the proper amplitude and phase to maintain oscillation. The result of using positive current feedback is that the oscillator will oscillate at the frequency at which erase head current is maximum. If the head inductance changes, frequency will also change in a direction to maintain series resonance and maximum head current. The amplitude of the erase head current depends upon the Q of the resonant circuit. This Q remains essentially constant over the expected range of frequency variation. Consequently, erase head current remains constant even though the frequency does not.

While the embodiment of the invention shown in the drawing employs PNP transistors and shows a common base push-pull amplifier configuration, this is by way of exemplification and is not by way of limitation. Those skilled in the art will be able to substitute different types of transistors or semiconductor amplifying devices or can use another transistor configuration, such as that of a common emitter or, in the case of vacuum tubes those of a common cathode connection, without departing from the scope and spirit of this invention. It also should be noted that the application of the oscillator circuit shown should not be construed as being limited to supplying an alternating current to an erase head. It may also be used in any application where the load is primarily reactive (either capacitive or inductive), and where it is desired to maintain a stable alternating current amplitude in the load while a frequency variation is allowable.

There has accordingly been described and shown herein a novel, useful and stable erase head oscillator.

What is claimed is:

1. In an oscillator circuit for delivering constant current to an inductive load and for maintaining the current constant regardles of frequency variations due to variations in circuit and load parameters, the circuit including amplifier means having an input, an output and biasing means, and means for applying operating potential to the oscillator circuit, the improvement comprising; a series resonant circuit including a capacitor connected in series with said inductive load; an output transformer having a center-tapped primary winding and a secondary winding, said center-tapped primary winding being connected across the output of said amplifier means, a current feedback transformer which senses the oscillator current amplitude in a series resonant circuit, said current feedback transformer having a primary winding and a center-tapped secondary winding, said secondary winding being connected across the input to said amplifier means, means connecting said output transformer secondary winding and said current feedback transformer primary winding in series with each other; means connecting said series resonant circuit across said series connected transformer windings; capacitor means defining in part said biasing means of the amplifier means and coupled to the center-tap of the current feedback transformer secondary winding for selectively biasing said amplifier means; said means for applying operating potential to the oscillator circuit being connected to the center-tap of the output transformer primary winding; said feedback transformer sensing the current variations in the series resonant circuit and thus the load and oscillator circuit parameter variations via the current feedback from said series resonant circuit, wherein said oscillator circuit is driven at a frequency which maximizes and maintains constant the current passed through the series resonant circuit.

2. An oscillator circuit comprising a first and second amplifier each having an input electrode, an output electrode, and a bias electrode, an output transformer having a center-tapped primary winding and a secondary winding, means for applying operating potential to the center tap of said output transformer primary winding, means connecting the output electrodes of said first and second amplifiers respectively to the opposite ends of said output transformer center-tapped primary winding, a feedback transformer having a primary winding and a center-tapped secondary winding, means connecting the respective first and second amplifier input electrodes to the respective opposite ends of the center-tapped secondary winding of said feedback transformer, means connected between said first and second amplifier bias electrodes and said means for applying operating potential for biasing said first and second amplifiers to their fully conductive states, means connecting in series said output transformer secondary winding and said feedback transformer primary winding, a series resonant circuit connected across said series connected output transformer secondary winding and feedback transformer primary winding, and capacitance means connected between said feedback transformer secondary winding center tap and said first and second amplifier bias electrodes for alternately biasing off said first and second amplifiers in the presence of feedback current from said feedback transformer.

3. An oscillator circuit as recited in claim 2 wherein each of said amplifiers comprises a transistor.

4. An oscillator circuit for a magnetic tape erase head comprising a first and second transistor, each having collector, base and emitter electrodes, an output transformer having a center-tapped primary winding and a secondary winding, means for applying operating potential to said output transformer primary winding center tap, means connecting the collectors of said first and second transistors respectively to the opposite ends of the output transformer primary winding, a feedback transformer having a primary winding and a center-tapped secondary winding, means connecting the opposite ends of said feedback transformer secondary winding to the respective emitters of said first and second transistors, means for biasing said first and second transistors to their saturated states of conduction connected between the bases of said first and second transistors and the center tap of said feedback transformer secondary winding, means connecting said output transformer secondary winding and said feedback transformer primary winding in series, a series resonant circuit connected across said series connected secondary winding of said output transformer and primary winding of said feedback transformer, and capacitive means connected between the bases of said respective first and second transistors and the center tap of said center-tapped secondary winding of said feedback transformer for biasing off said first and second transistors in response to current received from said feedback transformer.

5. An oscillator as recited in claim 4 wherein said bias means comprises a first resistor connected between the collector of said first transistor and its base, a second resistor connected between the base of said first transistor and the center tap of the secondary winding of said feedback transformer, a third resistor connected between the center tap of the secondary winding of said feedback transformer and the base of said second transistor, and a fourth resistor connected between the base of said second transistor and the collector of said second transistor.

References Cited

UNITED STATES PATENTS

| | | | |
|---|---|---|---|
| 2,560,483 | 7/1951 | Schoemehl | 179—100.2 |
| 2,965,856 | 12/1960 | Roesel | 331—113.1 |
| 3,241,088 | 3/1966 | Guyton | 331—114 |

FOREIGN PATENTS

| | | |
|---|---|---|
| 1,220,886 | 12/1958 | France. |

BERNARD KONICK, *Primary Examiner.*

R. SNIDER, *Assistant Examiner.*